Nov. 1, 1938.  L. DURGEN  2,134,967
FILTER
Filed May 10, 1937
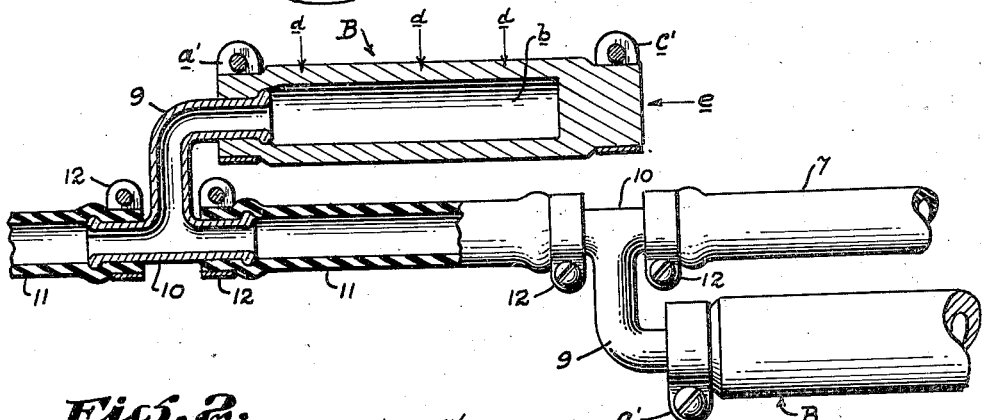
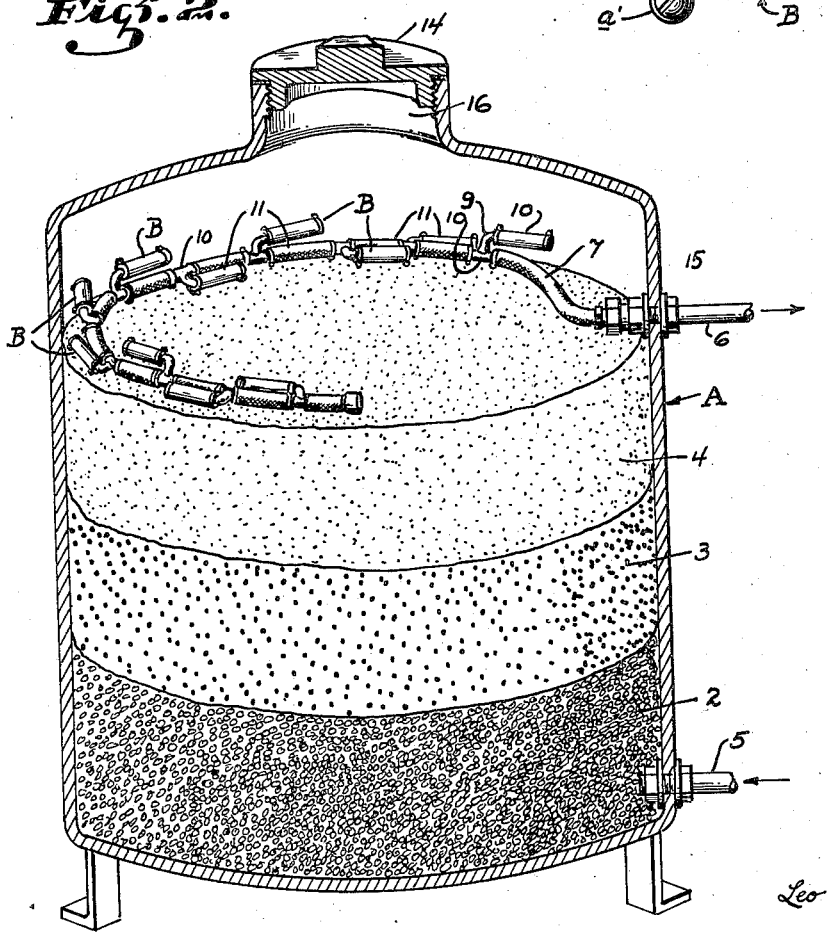
INVENTOR.
Leo Durgen.
BY Chas. E. Townsend.
ATTORNEY.

Patented Nov. 1, 1938

2,134,967

UNITED STATES PATENT OFFICE 2,134,967

FILTER

Leo Durgen, San Francisco, Calif.

Application May 10, 1937, Serial No. 141,695

4 Claims. (Cl. 210—171)

This invention relates to filters such as are used for filtering water and the like, and especially to a filter employing two or more filtering mediums, of different material and density, to permit one medium to remove coarser materials and foreign matter contained in the water, and the other medium finer materials.

The object of the present invention is to generally improve and simplify the construction and operation of filters; to provide a filter comprising a tank containing a bed of gravel and sand of considerable depth, through which water passes in an upward direction, and whereby the coarser materials, such as large particles of sediment, insects and other foreign matter are removed; to provide a chamber in the upper portion of the tank above the sand bed to receive the partially filtered water after its passage through the sand bed; to provide a series of filter tubes of a denser medium, through which the filtered water is forced, to complete the filtering operation; and further and more specifically stated, to provide a series of individual filter tubes which are adapted to be connected to a common flexible outlet hose or duct, which permits the filter tubes and hose to rest upon and be supported by the sand bed, and which furthermore permits the removal of the several filter tubes and the hose connecting the same, through a small hand-hole opening in the top of the tank, thereby facilitating cleaning, inspection and repair of the filtering tubes.

The filter is shown by way of illustration in the accompanying drawing, in which Fig. 1 is an enlarged sectional detail view showing a plurality of filter tubes and the flexible connections formed between them; and Fig. 2 is a central vertical section of a filter tank showing the sand bed and the filter tubes disposed above the same.

Referring to the drawing in detail, and particularly to Fig. 1, A indicates a tank of suitable diameter and length, the lower portion of which is filled with a layer 2 of coarse gravel. On top of this is placed a layer 3 of finer gravel, and on top of that, a layer 4 of sand. The water to be filtered enters through a pipe 5 and passes upwardly through the gravel layers 2 and 3 and finally through the sand layer 4, and would under normal conditions discharge through the pipe indicated at 6.

In actual practice, it is found that the upwardly rising water causes considerable turbulence of the sand in the upper layer, and that some of this sand, together with other foreign matter passes out through the pipe 6 with the water. In the present instance, this is prevented by providing a series of filter tubes such as indicated at B. These tubes are constructed of a denser medium than the filtering medium through which the water is previously passed, and as such permits the coarser foreign matter, such as heavy particles of sediment, insects, and the like, to be trapped and retained in the gravel or sand bed, and the finer sediments and other foreign matter to be filtered out when the water passes through the tubes B. The cleaning of the sand filtering bed is readily accomplished as often as required by mere reversal of the flow of water through the sand and gravel beds, but the cleaning of tubes such as those indicated at B is more difficult, particularly if it is desired to sterilize them for the purpose of destroying bacteria or the like. It is accordingly essential that the tubes be removed from time to time for cleaning, inspection and repair, and to permit such removal without complication forms one of the features of the present invention.

This is accomplished as follows: Disposed within the upper portion of the tank is a flexible hose 7 constructed of rubber or like material, which is provided with an ordinary hose coupling 15 to permit it to be connected with the discharge pipe 6. Connected with the hose 7 are a plurality of fittings such as indicated at 10. These are cast metal fittings, and each fitting is provided with an arm 9. A filter tube B is connected as clearly shown in Fig. 1. Between each fitting 10 is a rubber hose connection such as shown at 11, and as there are a number of fittings 10 and filter tubes carried thereby, an elongated flexible unit is formed, such as shown in Fig. 2. The construction is exceedingly simple. The hose members 11 connecting the filtering tubes or fittings 10 are secured to the fittings by ordinary hose clamps 12, and as such, each unit may be disconnected if desired, and more or less units may be added depending upon the capacity required. To permit ready removal of the entire unit, a hand-hole 14 is formed in the upper end of the tank, which is normally closed by a screw cover 16. By removing this cover, an operator can insert his hand and arm and disconnect the coupling 15, and then pull the entire unit out of the handhole opening. Individual filter tubes can be removed for inspection and repair, or the several connected units may be submerged in boiling water to sterilize them, and the hose coupling 15 may be connected with a faucet to exert internal pressure in the filter tubes, thereby reversing the flow and cleaning them of sediment or other foreign matter which may have settled on the internal surfaces of the tubes. After the filter tubes have been cleaned or sterilized, or both, they are again reinserted through the hand-hole opening 14 and are then connected by means of the coupling 15 with the discharge pipe 6, the whole operation being completed by merely screwing the cover 16 in place. A gasket or other suitable means may obviously be employed to make a tight connection.

While the filter tubes B may be made of any suitable material, I have found that balsa wood forms an ideal filtering medium. Filter units or tubes are formed from balsa wood by taking round or square blocks of the same and boring a central passage b' to receive the extension 9 of the fitting 10, then by applying an ordinary hose clamp a', as shown, the balsa wood tube is securely fastened to the arm 9, and a similar hose clamp c' may be applied to the opposite closed end if desired, this being the best practice, as I have found that balsa wood is more porous to a longitudinal flow, that is, it offers more resistance to lateral flow, as indicated by the arrows d, than it does to endwise flow as indicated by arrow e. Tubes made of balsa wood can be sterilized by dropping or submerging them in boiling water, and they will also stand considerable pressure both external and internal before disrupting. Be that as it may, while balsa wood forms an ideal filtering medium, other materials may obviously be employed.

While this and other features of the invention have been more or less specifically described and illustrated I nevertheless wish it understood that changes may be resorted to, within the scope of the appended claims, and that the materials and finish of the several parts employed may be such as the experience and judgment of the manufacturer may dictate.

I claim:

1. In a filter of the character described, a tank, a plurality of individual filter units disposed in the tank to which liquid to be filtered is delivered under pressure, said tank having a discharge outlet, a plurality of flexible conduits, one between each filter unit, said flexible conduits forming a common discharge conduit for all of the filter units; and means for connecting said conduit with the discharge outlet of the tank.

2. In a filter of the character described, a tank, a plurality of individual filter units disposed in the tank to which liquid to be filtered is delivered under pressure, said tank having a discharge outlet, a plurality of flexible conduits, one between each filter unit, said flexible conduits forming a common discharge conduit for all of the filter units; means for connecting said conduit with the discharge outlet of the tank, said tank having a hand-hole opening formed therein, through which the connected filter units are removable, and a closure for the hand-hole opening.

3. In a filter of the character described, a tank, a plurality of individual filter units disposed in the tank to which liquid to be filtered is delivered under pressure, said tank having a discharge outlet; each unit comprising a T-shaped pipe fitting, a filter tube connected to the leg of each T-fitting; a plurality of flexible tubes connecting the arms of the T-fittings and forming, together with said arms, a common discharge conduit for all of the filter tubes; and means for connecting the conduit with the discharge outlet of the tank.

4. In a filter of the character described, a tank, a plurality of individual filter units disposed in the tank to which liquid to be filtered is delivered under pressure, said tank having a discharge outlet; each unit comprising a T-shaped pipe fitting, a filter tube connected to the leg of each T-fitting; a plurality of flexible tubes connecting the arms of the T-fittings and forming, together with said arms, a common discharge conduit for all of the filter tubes; a detachable connection between said common conduit and the discharge outlet of the tank, said tank having a hand-hole opening formed therein through which the connected filter units are removable, and a closure for the hand-hole opening.

LEO DURGEN.